(12) United States Patent
Satyarthi et al.

(10) Patent No.: US 9,396,075 B2
(45) Date of Patent: Jul. 19, 2016

(54) METHOD AND SYSTEM OF PROTECTION SWITCHING IN A NETWORK ELEMENT

(75) Inventors: Nikhil Satyarthi, Bangalore (IN); Nishant Sharma, Bangalore (IN); Hiren Desai, Bangalore (IN)

(73) Assignee: Tejas Networks Limited, Bangalore (IN)

( * ) Notice: Subject to any disclaimer, the term of this patent is extended or adjusted under 35 U.S.C. 154(b) by 153 days.

(21) Appl. No.: 14/008,069

(22) PCT Filed: Aug. 11, 2011

(86) PCT No.: PCT/IN2011/000538
§ 371 (c)(1),
(2), (4) Date: Sep. 27, 2013

(87) PCT Pub. No.: WO2012/131695
PCT Pub. Date: Oct. 4, 2012

(65) Prior Publication Data
US 2014/0019799 A1  Jan. 16, 2014

(30) Foreign Application Priority Data
Mar. 31, 2011 (IN) .......................... 1098/CHE/2011

(51) Int. Cl.
| | |
|---|---|
| G06F 11/00 | (2006.01) |
| G06F 11/20 | (2006.01) |
| H04L 12/939 | (2013.01) |
| H04L 12/933 | (2013.01) |
| H04L 12/937 | (2013.01) |
| G06F 11/07 | (2006.01) |

(52) U.S. Cl.
CPC .......... *G06F 11/2002* (2013.01); *G06F 11/079* (2013.01); *H04L 49/101* (2013.01); *H04L 49/254* (2013.01); *H04L 49/557* (2013.01)

(58) Field of Classification Search
CPC ............ G06F 11/2002; G06F 11/2005; G06F 11/2007; H04L 45/22; H04L 45/28; H04L 49/557
See application file for complete search history.

(56) References Cited

U.S. PATENT DOCUMENTS

| | | | |
|---|---|---|---|
| 6,202,170 B1 * | 3/2001 | Busschbach et al. | ............ 714/11 |
| 6,650,749 B1 * | 11/2003 | Laulo | ............. 379/279 |
| 2005/0099941 A1 * | 5/2005 | Sestito et al. | ................. 370/228 |
| 2007/0133397 A1 * | 6/2007 | Bianchi et al. | ................ 370/225 |
| 2008/0219156 A1 * | 9/2008 | Caviglia et al. | ............... 370/228 |

* cited by examiner

*Primary Examiner* — Philip Guyton
(74) *Attorney, Agent, or Firm* — Brundidge & Stanger, P.C.

(57) ABSTRACT

A method and system protects switching in a network element. At least one data signal at the client entity is received, wherein the signal flow through server entity via the client entity. A configuring protection group on at least one client entity is served by at least two server entity, wherein the protection group includes at least one work entity and at least one protect entity. A plurality of supplement client entities of client entity is created such that at least one of the supplement client entity flows over one server entity and checking the entities for a fault to raise alarm to their respective controllers. The controller includes at least one server layer protection controller and at least one client layer protection controller.

14 Claims, 4 Drawing Sheets

METHOD AND SYSTEM OF PROTECTION SWITCHING IN A NETWORK ELEMENT

FIELD OF THE INVENTION

This invention relates generally to digital transmission networks and, more particularly, to a method of protection switching in a network element.

BACKGROUND OF THE INVENTION

Network protection is quite an essential requirement in transport networks. As it can't be assumed that the end to end link is always available, some form of traffic protection is required via backup link to provide end to end connectivity. In general in any protection mechanism there are M protect entities which protect N work entities.

The three basic components which are used in any of the protection mechanisms are signaling protocol, protection controller and a switch matrix or fabric. The signaling protocol is to co-ordinate between transmit and receive ends (i.e. K-bytes). The protection controller takes the decisions with respect to switching of the traffic. The final component is the switch matrix which selects between the work or protect based on the commands received from the protection controller. The protection controller commands the switch matrix to route the traffic from work or protect. A single protection mechanism is which protects at least one layer. Coexistence of protection mechanisms at multiple layers at the same time is called nested protection. The nested protection is used for enhanced network survivability where protection is configured for at multiple layers and each protection mechanisms healing against the failure at their respective layers.

Each client entity layer and server entity layer of the nested protection mechanism have their own switch fabrics and the decision of switching is taken care at their level itself by a client layer protection controller and a server layer protection controller respectively. A system with distributed switch fabric is costly but nested protection is quite simple to implement there due to the independent protection switching mechanism operating at the respective layers. A system with centralized fabric is quite cheaper to build but for all the switching processes, both the client layer protection controller and the server layer protection layer has to refer to the centralized fabric, due to same complexity of the protection switching mechanism increases Therefore there is a need for a method of protection switching in a centralized switch fabric of a network element to overcome the above limitations and restrictions.

SUMMARY OF THE INVENTION

An aspect of the present invention is to address at least the above-mentioned problems and/or disadvantages and to provide at least the advantages described below.

Accordingly, an aspect of the present invention is to provide a method of protection switching in a network element, the network element comprising a centralized switch fabric including at least one client entity over at least one server entity, the method comprising receiving at least one data signal at the client entity, wherein the signal flow through server entity via the client entity, configuring protection group on at least one client entity served by at least two server entity, wherein the protection group includes at least one work entity and at least one protect entity, creating a plurality of supplement client entities of client entity such that at least one of the supplement client entity flows over one server entity and checking the entities for a fault to raise alarm to their respective controllers, wherein the controller include at least one server layer protection controller and at least one client layer protection controller.

In accordance with another aspect of the present invention provide a system of protection switching in a network element, comprising, a centralized processor, a memory coupled to the processor for storing the data, a client entity and a client layer protection controller, a server entity and a server layer protection controller; and a network protocol module coupled to the processor, the client layer protection controller and the server layer protection controller, wherein the processor is configured for receiving at least one data signal at the client entity, wherein the signal flow through server entity via the client entity, configuring protection group on at least one client entity served by at least two server entity, wherein the protection group includes at least one work entity and at least one protect entity, creating a plurality of supplement client entities of client entity such that at least one of the supplement client entity flows over one server entity and checking the entities for a fault to raise alarm to their respective controllers, wherein the controller include at least one server layer protection controller and at least one client layer protection controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Figure 1:
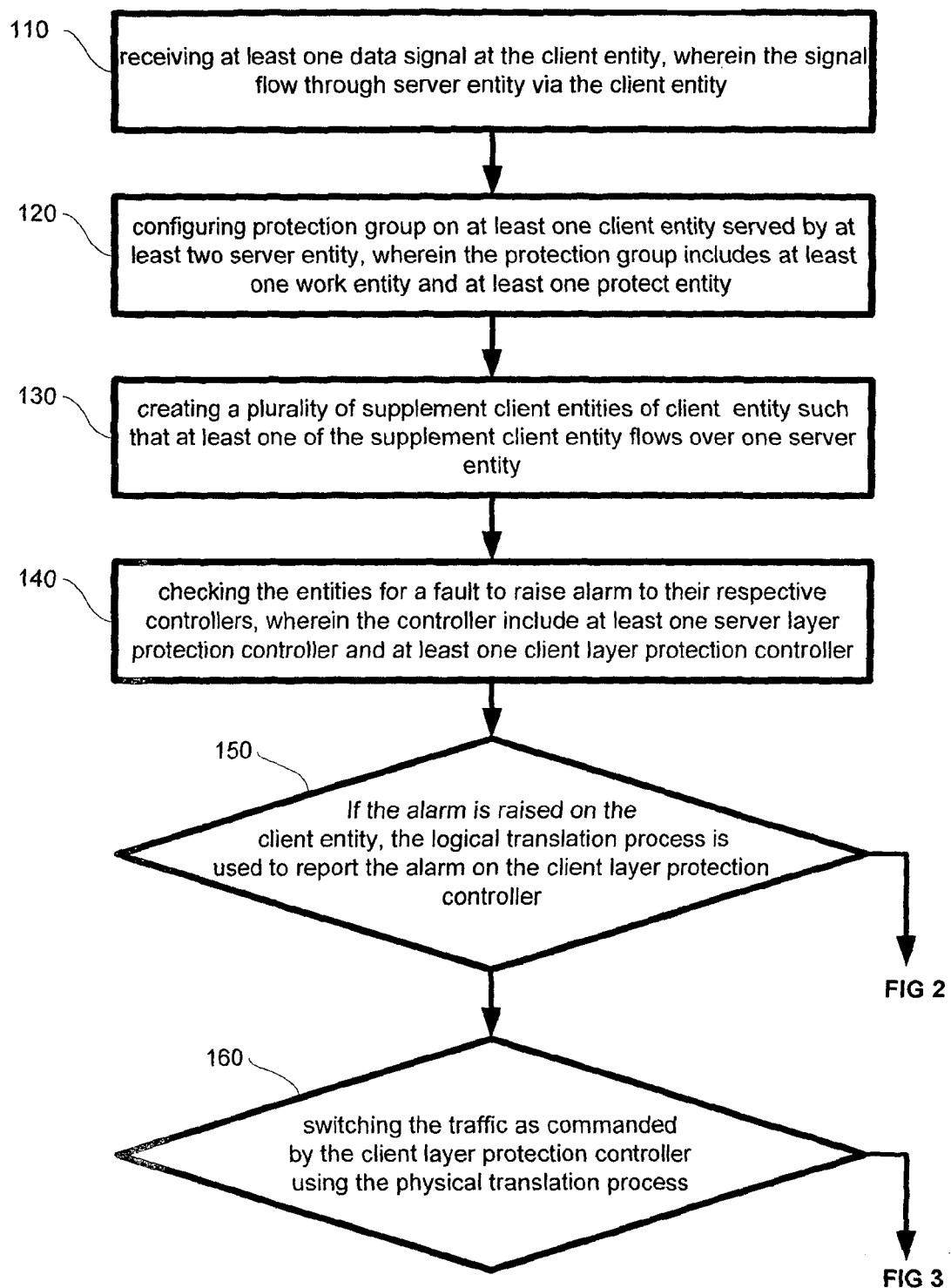
FIG. 1 is a flow chart of a method of protection switching in a network element, in accordance with one embodiment of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 4, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a flow chart of a method of protection switching in a network element, the network element comprising a centralized switch fabric including at least one client entity over at least one server entity, in accordance with one embodiment of the present invention.

At step 110, the method receives one or more data signal at the client entity, where the data signal flow through one or more server entity via one or more client entity.

At step 120, the method configures protection group on one or more client entity served by one or more server entity (where the protection group is also configured on the server entity). The protection group includes one or more work entity and one or more protect entity.

At step 130, the method creates a plurality of client work entities, where the client work entities includes one or more client work real entity and one or more client work supplement entities. The client work supplement entities flow over at least one server entity.

At step 140, the method checks for a fault at the entities in order to raise alarm to their respective protection controllers. The protection controller has at least one server layer protection controller and at least one client layer protection controller.

At step 150, the method translates the alarm on a client entity using the logical translation process, and reports the same to the client layer protection controller. The method also translates the incoming protocol message on a client entity using the logical translation process and reports the same to the client layer protection controller.

At step 160, the method switches the traffic as commanded by the client layer protection controller using the physical translation process.

Figure 2:
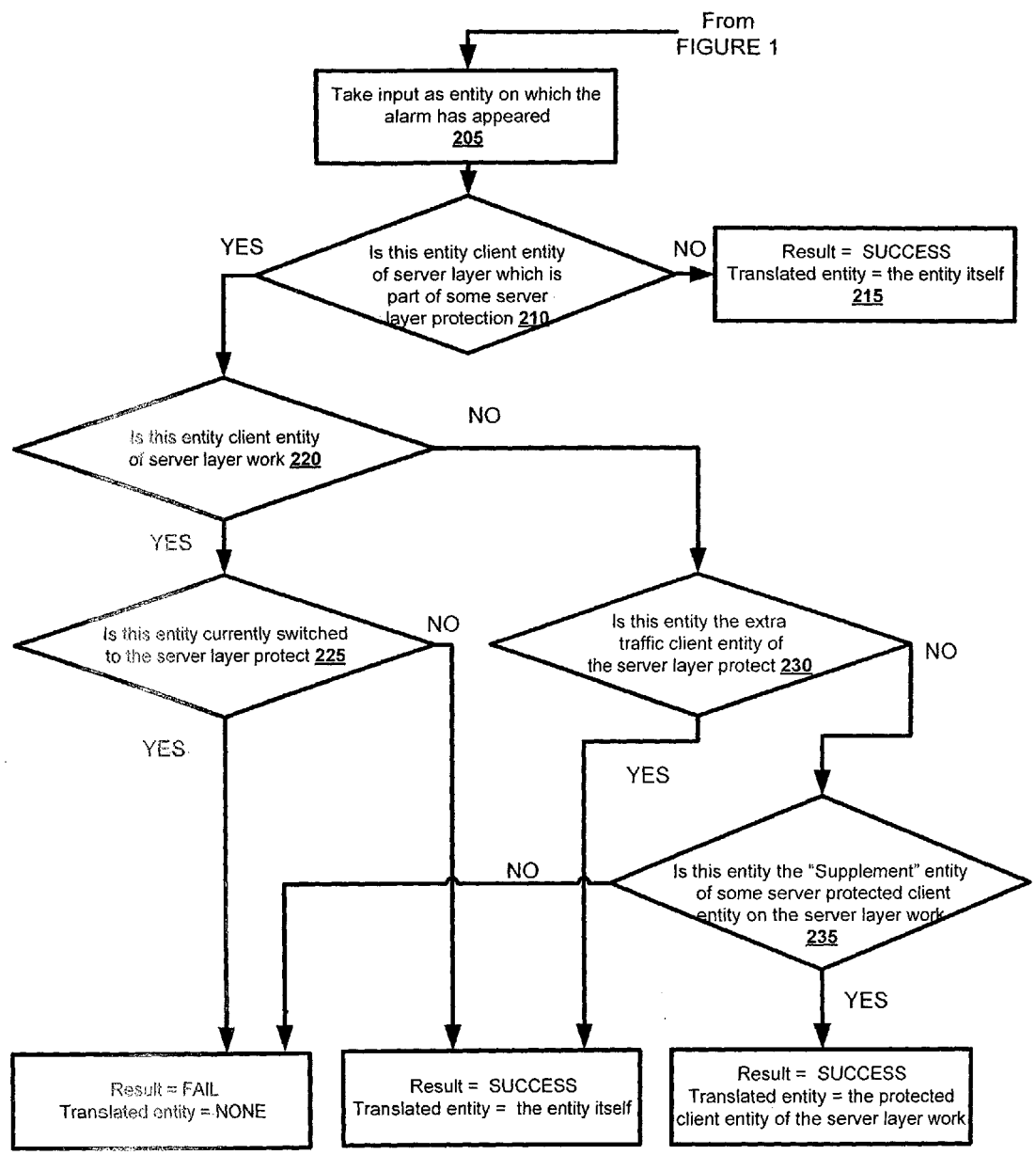
FIG. 2 is a flow chart for the step of logical translation with reference to FIG. 1, in accordance with one embodiment of the present invention.

FIG. 2 is a flow chart for the step of logical translation with reference to FIG. 1, in accordance with one embodiment of the present invention. Before using the logical translation function, the method has to identify on which client entity the alarm has appeared. At step 205, the method identifies the entity on which the alarm has generated. At step 210, the method checks whether the entity is a client entity of server layer which is part of some server layer protection. If No, the method moves to step 215 to translate the entity itself. Otherwise, the method jumps to step 220, to check whether the entity is a client entity of server layer work. If yes, the method further checks at step 225 for whether the entity is currently switched to the server layer protect. If yes, the method does not take any action of translation. If No, the method translates the entity itself.

At step 220, if the entity is not a client entity of server layer work, the method moves to step 230 to check further, whether the client entity is the extra traffic client entity of the server layer protect. If yes, the method translates the entity as the entity itself. If No, the method further checks at step 235, whether the entity is the supplement entity of some server protected client entity on the server layer work. If yes, the method translates the entity as the protected client entity of the server layer work. If No, the method does not take any action of translation.

Figure 3:
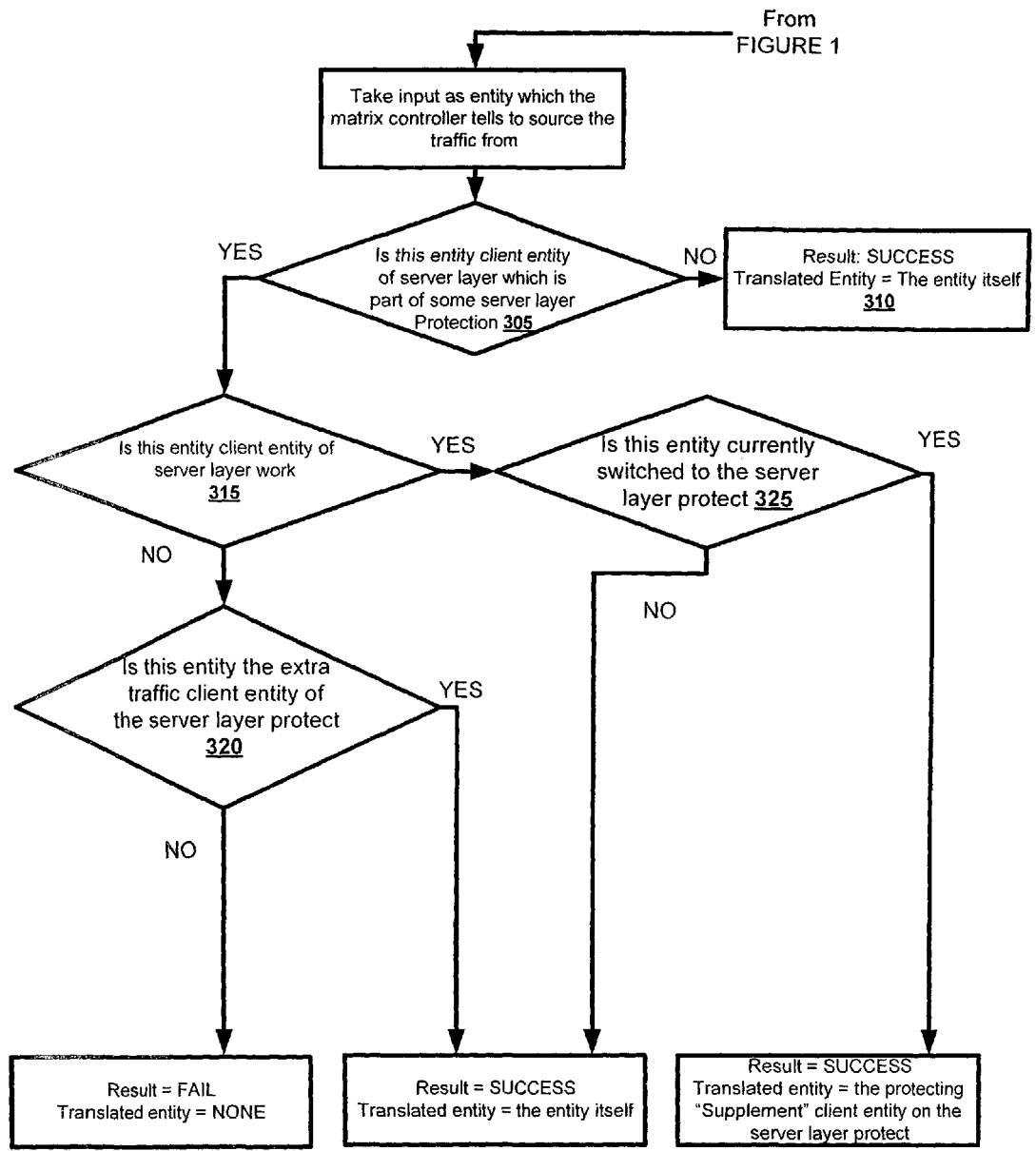
FIG. 3 is a flow chart for the step of physical translation with reference to FIG. 1, in accordance with one embodiment of the present invention.

FIG. 3 is a flow chart for the step of physical translation with reference to FIG. 1, in accordance with one embodiment of the present invention. Before using the physical translation function, the method has to identify the client entity from which the client layer protection controller has commanded to switch the traffic. At step 305, the method checks whether the entity is a client entity of server layer which is part of some server layer protection. If No, the method translates the entity itself at step 310. If yes, the method checks at step 315 whether the entity is a client entity of server layer work, if No the method further checks at step 320, whether the entity is the extra traffic client entity of the server layer protect, If yes, translates the entity itself else (if No), the method does not take any action of translation.

At step 315, if method confirms that the entity is a client entity of server layer work, then method further checks at step 325, whether the entity is currently switched to the server layer protect. If yes, the method translates entity as the protection supplement client entity on the server layer protect. Else, the method translates the entity itself.

Figure 4:
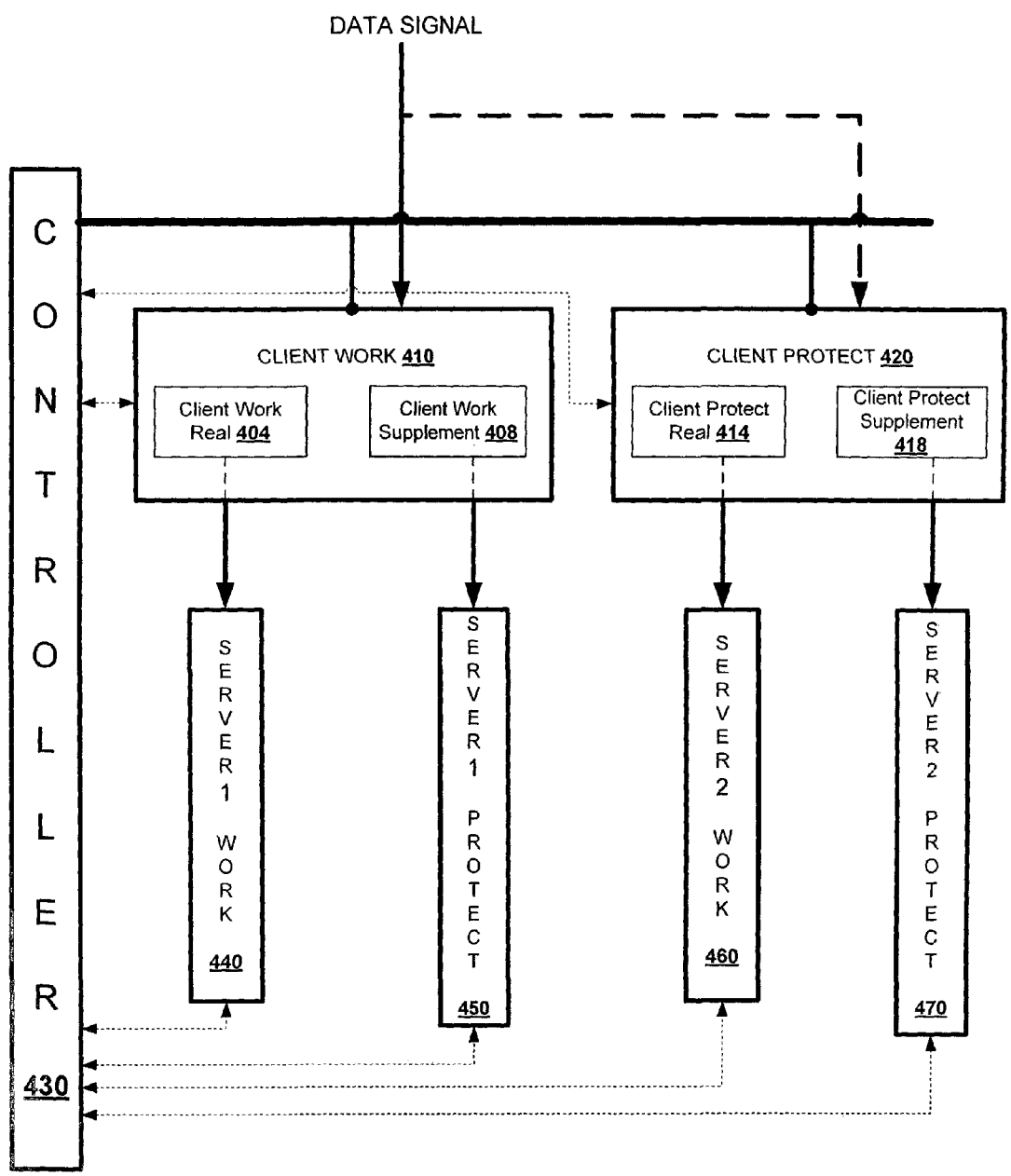
FIG. 4 is an example system diagram of protection switching in a network element, the network element comprising a centralized switch fabric including at least one client entity over at least one server entity, in accordance with one embodiment of the present invention.

FIG. 4 is an example system diagram of protection switching in a network element, the network element comprising a centralized switch fabric including at least one client entity over at least one server entity, in accordance with one embodiment of the present invention. The system includes one or more client entity, one or more server entities, and a centralized processor 430. The client entity includes client work entity 410 and a client protect entity 420. The server entity includes server work entity 440 and 460, server protect entity 450 and 470. For better understanding the following description has restricted to two client entities. There may be any number of client work entity and client protect entity, similarly any number of server work entity and server protect entity for each client entity. The centralized processor may be or may include one or more memory for storing the data. Further in the system, the client entities have a client layer protection controller and the server entities have a server layer protection controller. The client and server protection controllers are not shown to reduce the complexity of the drawings without restriction the scope of the invention.

The processor may be or may include a network protocol module (not shown in figure). In an operation of the system, wherein the processor is configured for receiving one or more data signal at the client entity, wherein the signal flow through server entity via the client entity. Secondly, the system configures protection group on one or more client entity served by at least two server entities. The protection group includes at least one work entity and at least one protect entity. The system creates a plurality of supplement client entities of client entity such that at least one of the supplement client entities flow over one server entity. Further, the system checks the entities for a fault to raise alarm to their respective controllers, wherein the controller may include one or more server layer protection controller and one or more client layer protection controller.

In one embodiment, the server layer protection controller is configured for switching the traffic to the server protect entity via the supplement client entity, if the fault is at the server work entity.

In another embodiment, the client layer protection controller is configured to use the function of logical translation to inform the client layer protection controller about the fault and/or protocol message.

In another embodiment, the client layer protection controller is configured to use the function of physical translation to switch the traffic to a client entity.

In one embodiment, the client entity and the server entity are capable of transmitting the fault information to their respective controllers, wherein the fault information includes operator commands.

In one embodiment, the logic of translation (logical and physical) process for a client depends on the state of the respective server layer protection controller.

FIGS. 1-4 are merely representational and are not drawn to scale. Certain portions thereof may be exaggerated, while others may be minimized. FIGS. 1-4 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

We claim:

1. A method of protection switching in a network element, the network element comprising a centralized switch fabric including at least one client entity over at least one server entity, the method comprising:
    receiving at least one data signal at the client entity, wherein the signal flow through server entity via the client entity;
    configuring a protection group on at least one client entity served by at least two server entities, wherein the protection group includes at least one work entity and at least one protect entity;
    creating a plurality of supplement client entities of client entity such that at least one of the supplement client entity flows through one server entity; and
    checking the entities for a fault to raise alarm to their respective controllers, wherein each respective controller includes at least one server layer protection controller and at least one client layer protection controller,
    wherein a decision of the client layer protection controller to switch traffic to one of the client entities, undergoes a physical translation process which in turn switches the traffic to this translated client entity on the central fabric.

2. The method of protection switching of claim 1, wherein the checking includes, if the fault is at a server work entity, the method switches traffic to a server protect entity via a supplement client entity.

3. The method of protection switching of claim 1, wherein the checking includes, if the fault is at the client entity, the method use a function of logical translation to inform the client layer protection controller about the fault and the client layer protection controller takes necessary protection switching actions.

4. The method of protection switching of claim 1, wherein the checking includes, if an incoming protocol message is at the client entity, the method use a function of logical translation to inform the client layer protection controller about the protocol message and the client layer protection controller takes necessary protection switching actions.

5. The method of protection switching of claim 1, wherein output of the logical translation function for a client depends on a state of the respective server layer protection controller.

6. The method of protection switching of claim 1, wherein output of the physical translation function for a client depends on a state of the respective server layer protection controller.

7. The method of protection switching of claim 1, wherein each client entity have a client work entity and a client protect entity, wherein the client work entity and the client protect entity includes a plurality of supplement client work entities and a plurality of supplement client protect entities.

8. The method of protection switching of claim 7, wherein a plurality of client work real and supplement entities and a plurality of client protect real and supplement entities will function as one client work entity and one client protect entity.

9. The method of protection switching of claim 8, wherein the plurality of client work entities includes at least one client work real and at least one client work supplement, and wherein the plurality of client protect entities includes at least one client protect real and at least one client protect supplement.

10. A system of protection switching in a network element, comprising:

a centralized processor; a memory coupled to the processor for storing data; a client entity and a client layer protection controller;
a server entity and a server layer protection controller; and
a network protocol module coupled to the processor, the client layer protection controller and the server layer protection controller, wherein the processor is configured for:
receiving at least one data signal at the client entity, wherein signals flow through server entity via the client entity;
configuring a protection group on at least one client entity served by at least two server entities, wherein the protection group includes at least one work entity and at least one protect entity;
creating a plurality of supplement client entities of client entity such that at least one of the supplement client entity flows through one server entity; and
checking the entities for a fault to raise alarm to their respective controllers, wherein each respective controller includes at least one server layer protection controller and at least one client layer protection controller,
wherein the client layer protection controller is configured to use a function of logical translation to inform the client layer protection controller about the fault and/or protocol message.

11. The system of protection switching of claim 10, wherein the server layer protection controller is configured for switching traffic to the server protect entity via a supplement client entity, if the fault is at a server work entity.

12. The system of protection switching of claim 10, wherein the client layer protection controller is configured to use a function of physical translation to switch traffic to a client entity.

13. The system of protection switching of claim 10, wherein the client entity and the server entity are capable of transmitting fault information to their respective controllers, wherein the fault information includes operator commands.

14. The system of protection switching of claim 10, wherein logic of logical and physical translation process for a client depends on a state of the respective server layer protection controller.

\* \* \* \* \*